United States Patent [19]
Mills et al.

[11] Patent Number: 5,959,637
[45] Date of Patent: Sep. 28, 1999

[54] METHOD AND APPARATUS FOR EXECUTING A RASTER OPERATION IN A GRAPHICS CONTROLLER CIRCUIT

[75] Inventors: Karl Scott Mills, Lynnwood; Jeffrey Michael Holmes, Seattle; Mark Emil Bonnelycke, Seattle; Richard Charles Andrew Owen, Seattle, all of Wash.

[73] Assignee: Cirrus Logic, Inc., Fremont, Calif.

[21] Appl. No.: 08/667,248

[22] Filed: Jun. 20, 1996

Related U.S. Application Data

[60] Provisional application No. 60/000,490, Jun. 23, 1995.

[51] Int. Cl.$^6$ .......................... G06T 091/20; G06F 15/00
[52] U.S. Cl. .......................... 345/506; 345/520; 345/191
[58] Field of Search ...................... 345/501–506, 345/520–526, 507, 509, 191, 429–432, 112–115, 150, 153–155

[56] References Cited

U.S. PATENT DOCUMENTS

| | | | |
|---|---|---|---|
| 5,218,431 | 6/1993 | Gleicher et al. | 358/13 |
| 5,251,298 | 10/1993 | Nally | 395/166 |
| 5,261,049 | 11/1993 | Lumelsky et al. | 395/164 |
| 5,270,688 | 12/1993 | Dawson et al. | 345/150 |
| 5,420,608 | 5/1995 | Choi et al. | 345/186 |
| 5,430,464 | 7/1995 | Lumelsky | 345/191 |
| 5,473,342 | 12/1995 | Tse et al. | 345/132 |
| 5,479,605 | 12/1995 | Saitoh | 345/524 |
| 5,493,643 | 2/1996 | Soderberg et al. | 345/505 |
| 5,598,525 | 1/1997 | Nally et al. | 345/520 |
| 5,600,847 | 2/1997 | Guttag et al. | 395/800.36 |
| 5,604,514 | 2/1997 | Hancock | 345/154 |
| 5,673,407 | 9/1997 | Poland et al. | 395/563 |
| 5,717,440 | 2/1998 | Katsura et al. | 345/513 |

*Primary Examiner*—U. Chauhan
*Attorney, Agent, or Firm*—Robert P. Bell; Steven A. Shaw

[57] ABSTRACT

A graphics controller circuit comprising a plurality of pipelines for performing a set of operations on a stream of input pixel data to generate at least a first operand and a second operand. A rasterop unit in the graphics controller circuit may receive the first operand and the second operand, and execute a raster operation using the first operand and the second operand to generate a set of display pixel data. The graphics controller circuit may further comprise a transparency unit for generating a write enable mask corresponding to the set of display pixel data. A display memory may selectively store or block the set of display pixel data according to the write enable mask. As the graphics controller generates display signals from the display data stored in display memory, a transparency operation may be performed.

30 Claims, 12 Drawing Sheets

METHOD AND APPARATUS FOR EXECUTING A RASTER OPERATION IN A GRAPHICS CONTROLLER CIRCUIT

CROSS-REFERENCE TO RELATED APPLICATIONS

The present application claims priority from Provisional Application Ser. No. 60/000,490 entitled "Byte Enable FIFO Architecture" filed Jun. 23, 1995. The present application is also related to application Ser. No. 08/536,553, entitled "A Method and Apparatus for Minimizing Number of Pixel Data Fetches Required for a Stretch Operation of Video Images", filed Sep. 28, 1995, U.S. Pat. No. 5,727,139, incorporated herein by reference.

FIELD OF THE INVENTION

The present invention relates generally to computer graphics systems and more specifically to a method and apparatus for executing a raster operation in a graphics controller circuit.

BACKGROUND OF THE INVENTION

Graphics controller circuits which generate display signals to display an image corresponding to input display data are known in the prior art. FIG. 1 is a block diagram of computer system 100 comprising one such graphics controller circuit 120. Graphics controller circuit 120 may generate display signals over display bus 123 to display an image corresponding to input display data on display unit 130.

Display data may include different types of data such as video data, graphics data, and text data. Video data may comprise, for example, a television signal encoded in RGB 888 format or in a monochrome pixel data format. Such video data may correspond to display on individual pixels on display unit 130. Graphics controller circuit 120 may receive such video data from an external device (not shown) over video port 151, or from host 110 over system bus 112.

Text data may comprise alpha-numeric characters represented by a predetermined number of bits of input display data. Graphics controller circuit 110 may map each alpha-numeric character to a predetermined pixel data pattern, and generate display signals corresponding to such pixel data pattern. Graphics data may comprise pixel data corresponding to each pixel on display unit 130.

Graphics controller circuit 120 may perform several pre-processing steps on input display data, and provide the output of such pre-processing steps as operands for a raster operation. Graphics controller 120 may provide the output pixel data of such raster operations as input to an additional raster operation, or generate display signals from the pixel data generated from such raster operations.

A raster operation may comprise a plurality of operands, and may be specified by host 110 over system bus 112. For example, host 110 may request graphics controller circuit 120 to perform a logical OR raster operation of two operands, with each operand comprising a portion of the input display data. Graphics controller circuit 120 may generate display pixel data by performing such a raster operation, and generate display signals from such display pixel data.

The raster operations specified by host 110 may further include a transparency operation. In a transparency operation, a portion of the pixel data may be coded in a predetermined color, and such portion may be replaced with another portion of the pixel data. The two portions of the pixel data may correspond to two images. Such a transparency operation may be provided to selectively superimpose one image over another image.

For example, in a weather report review of a television broadcast, a weather reporter may be located in front of a blue background. By using a transparency operation, the blue portion of the image may be superimposed by an image of a weather map to give the perception that the weather reporter is in front of the weather map. Such a background color may be hereinafter referred to as a background color for a transparency operation.

The pre-processing steps performed by graphics controller circuit 120 prior to executing a raster operation may include several operations. For example, such operations may include converting a monochrome pixel data to a color pixel data. The operations may also include shifting pixel data to achieve a required alignment of a pixel data within a memory word. Such shifting may be required, for example, as pixel data of an operand may be stored beginning from an intermediate position within a memory word.

A prior art graphics controller 120 may employ a single pipe-lined architecture to perform a set of pre-processing steps for generating the operands of a raster operation. In a single pipe-lined architecture, graphics controller circuit 120 may comprise sub-circuits which may operate concurrently to perform individual operations comprised in the pre-processing steps. By performing operations concurrently, graphics controller circuit 120 may enhance an output rate of pixel data generated for display on display unit 130. Graphics controller circuit 120 of the prior art may include only a single pipe-line to conserve silicon space.

One problem with graphics controller circuit 120 employing only a single pipe-line for generating operands for raster operations is that the pixel data output rate from raster operations may be insufficient to maintain a required refresh rate on display unit 130. The pixel data output rate may be insufficient, for example, as a single pipe-line in graphics controller 120 may generate sequentially pixel data corresponding to each operand of a raster operation.

SUMMARY OF THE INVENTION

A graphics controller circuit may comprise a plurality of pipelines including at least a first pipeline and a second pipeline for performing a set of operations on a stream of input pixel data to generate a first operand and a second operand respectively for a raster operation. The graphics controller circuit of the present invention may also comprise a rasterop unit to execute the raster operation using the first operand and the second operand to generate a set of display pixel data.

The graphics controller circuit may further comprise an interface to transfer a set of display pixel data to a memory, wherein the memory may store the set of display pixel data, and wherein the controller circuit may generate a set of display signals to a display unit from the set of pixel data stored in the memory.

The graphics controller circuit may further comprise a transparency unit for generating a write enable mask, wherein the memory receives the set of display pixel data from the rasterop unit and selectively stores the set of display pixel data according to the write enable mask. Such a selective storing capability, in combination with generating display signals from the memory, may allow graphics controller circuit of the present invention to perform a transparency operation.

3

The transparency unit of the present invention may comprise a color transparency generator for receiving a set of color pixel data and for generating the write enable mask from the set of color pixel data, and a monochrome transparency generator for receiving a set of monochrome pixel data and for generating the write enable mask from the set of monochrome pixel data. The set of monochrome and color pixel data may be comprised in a stream of input pixel data.

The plurality of pipelines in the graphics controller circuit may further comprise a third pipeline for performing a set of operations on the stream of input pixel data to generate a third operand for the raster operation. The graphics controller circuit may further comprise an interpolation unit for interpolating a stream of input pixel data to generate pixel data corresponding to an upscaled video image. The interpolation unit may provide pixel data corresponding to the upscaled video image as the second operand to the rasterop unit.

The graphics controller circuit may further comprise a pixel FIFO for receiving the set of pixel data from the rasterop unit, and the interface circuit may transfer the set of pixel data from the pixel FIFO to the memory. The graphics controller circuit of the present invention may also include a third multiplexor for receiving the set of input pixel data from a host or the memory or the pixel FIFO, and selectively forward the set of pixel data to one of the plurality of pipelines.

The first pipeline and the second pipeline may further comprise a memory interface circuit for receiving the set of pixel data, a converter for converting the set of pixel data to a set of color pixel data if the set of pixel data comprise monochrome pixel datal, a barrel shifter for rotating the set of pixel data within a word to generate a set of rotated data words, and an operand storage unit coupled to the convertor and the barrel shifter for receiving the set of color pixel data and the set of rotated data words.

4

Figure 9:
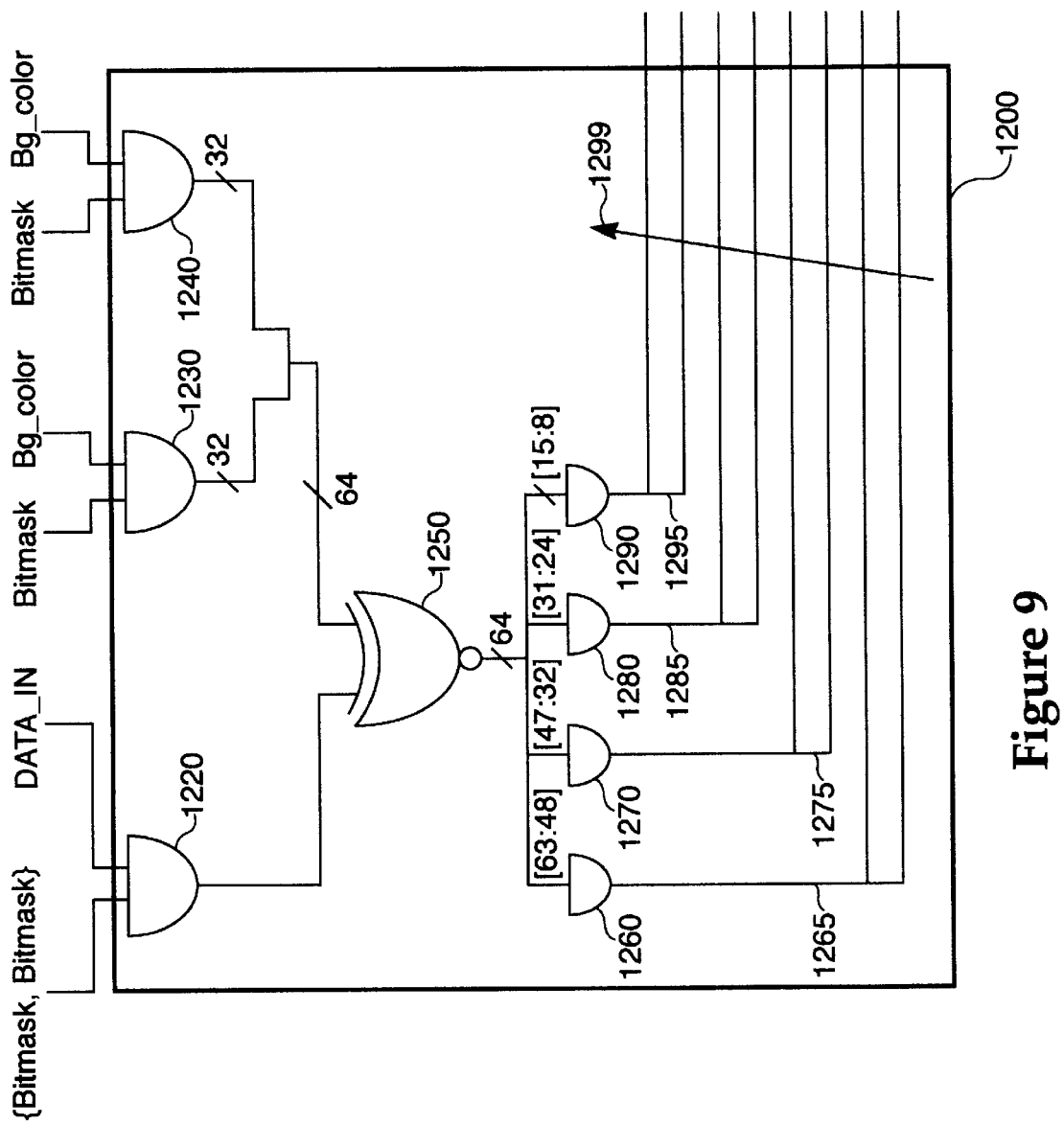

FIG. 9 is block diagram of a part of a write enable mask generation circuit for generating a write enable mask from input display data encoded in sixteen bits per pixel format.

Figure 10:
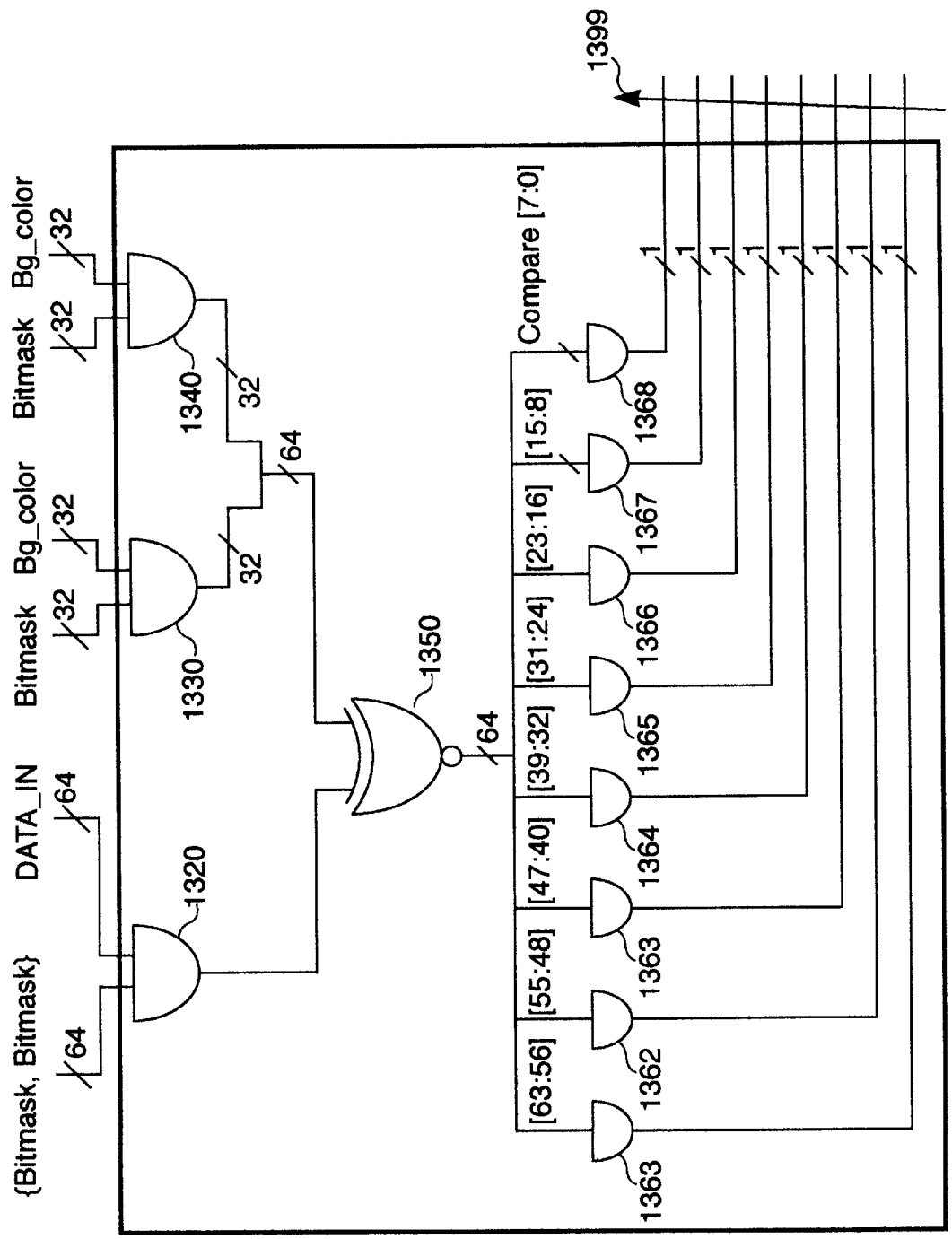

FIG. 10 is block diagram of a part of a write enable mask generation circuit for generating a write enable mask from input display data encoded in eight bits per pixel format.

Figure 11:
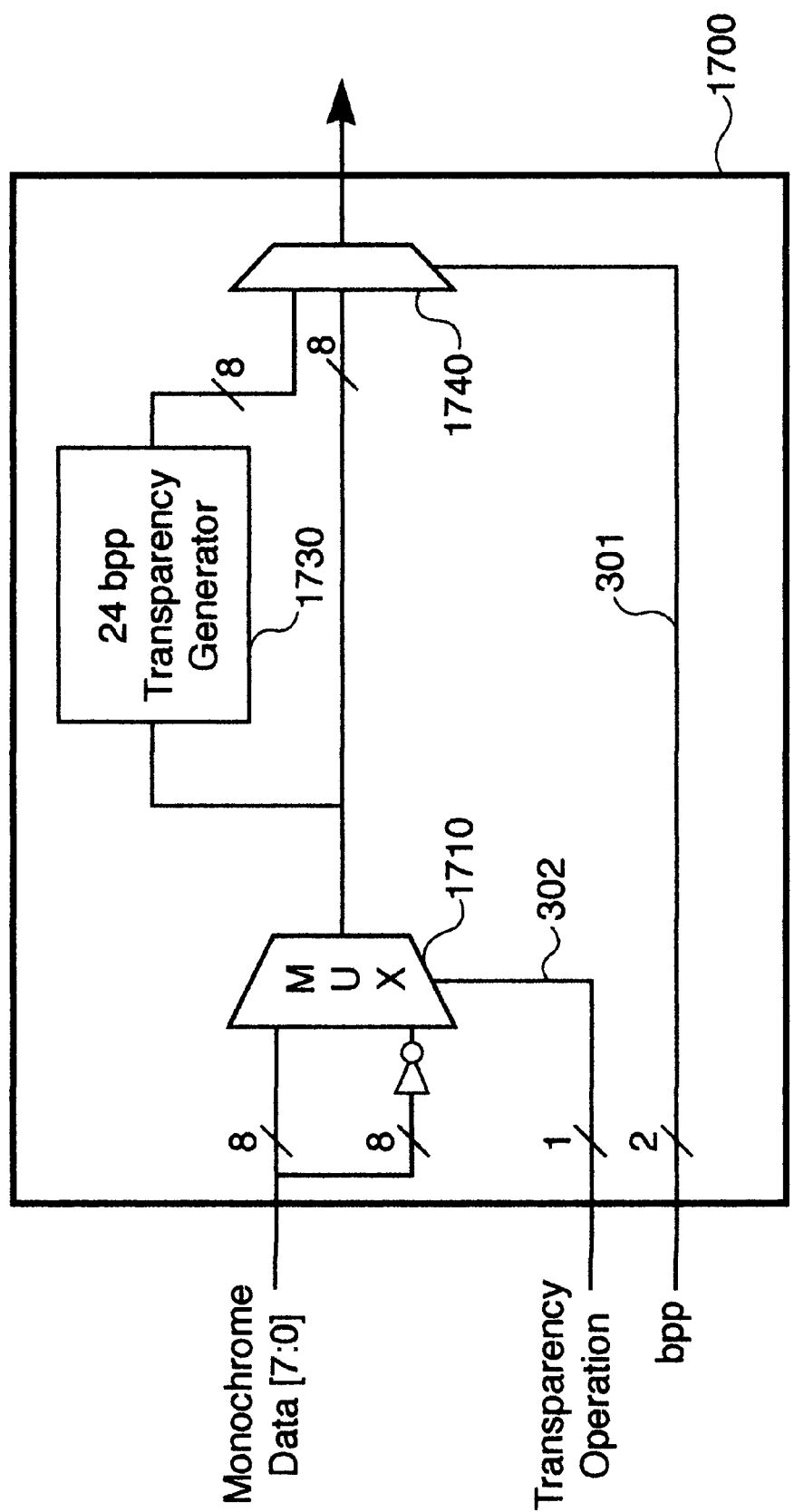

FIG. 11 is a block diagram of a monochrome transparency unit comprised in the transparency unit for generating write enable mask from monochrome pixel data.

Figure 12:
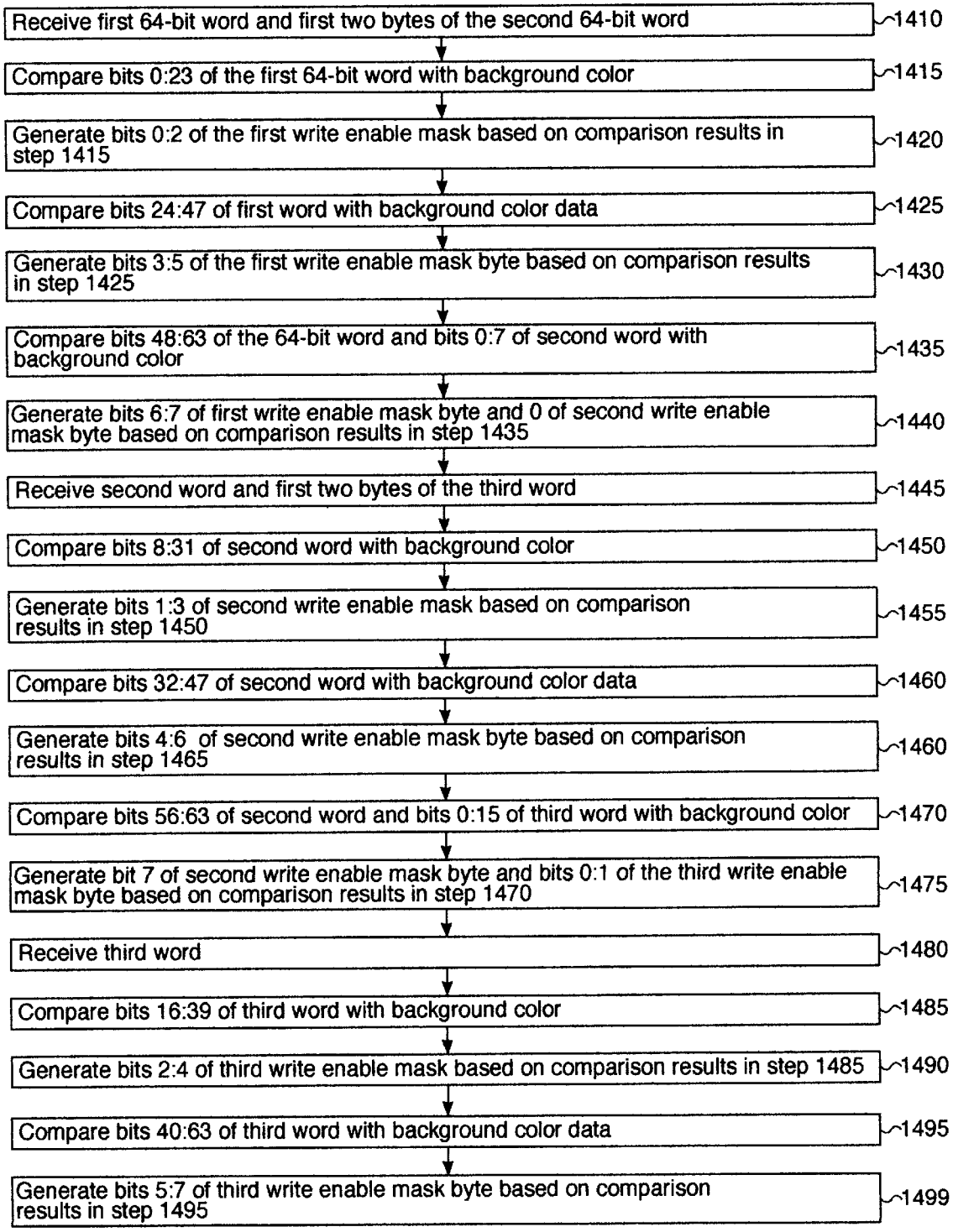

FIG. 12 is a flow chart illustrating a method in which the write enable mask generation circuit of the present invention generates write enable mask for color pixel data encoded in 24 bits per pixel format.

Figure 13A:
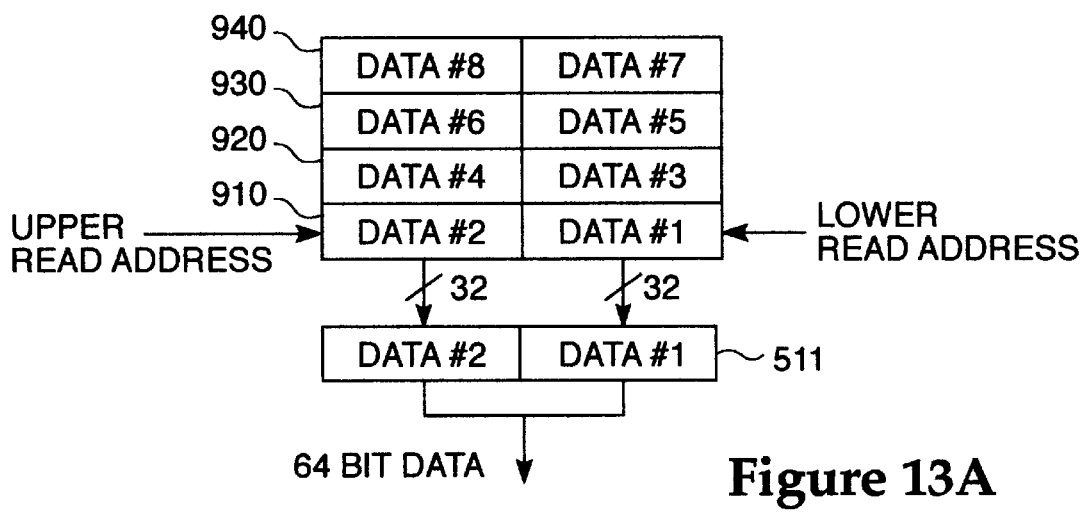
Figure 13B:
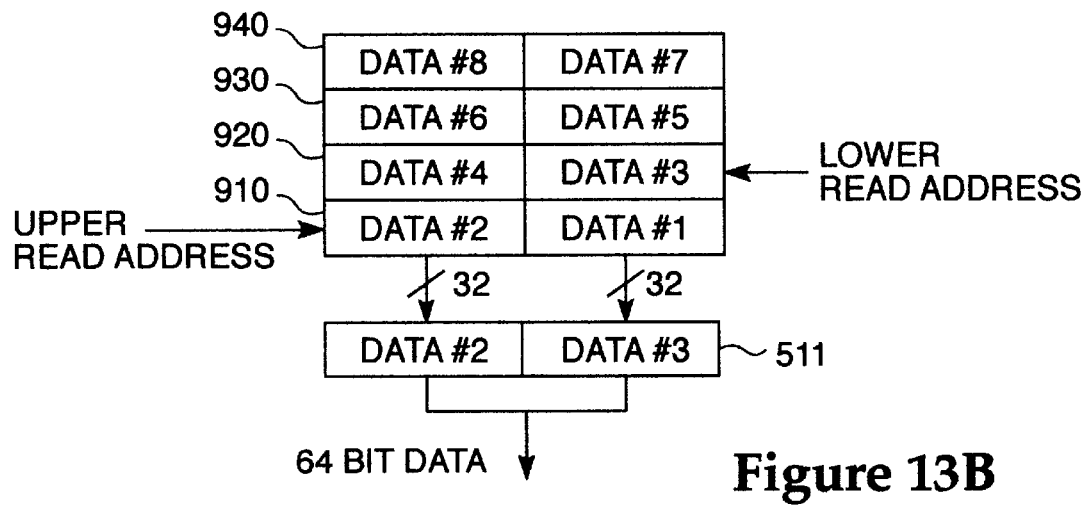
Figure 13C:
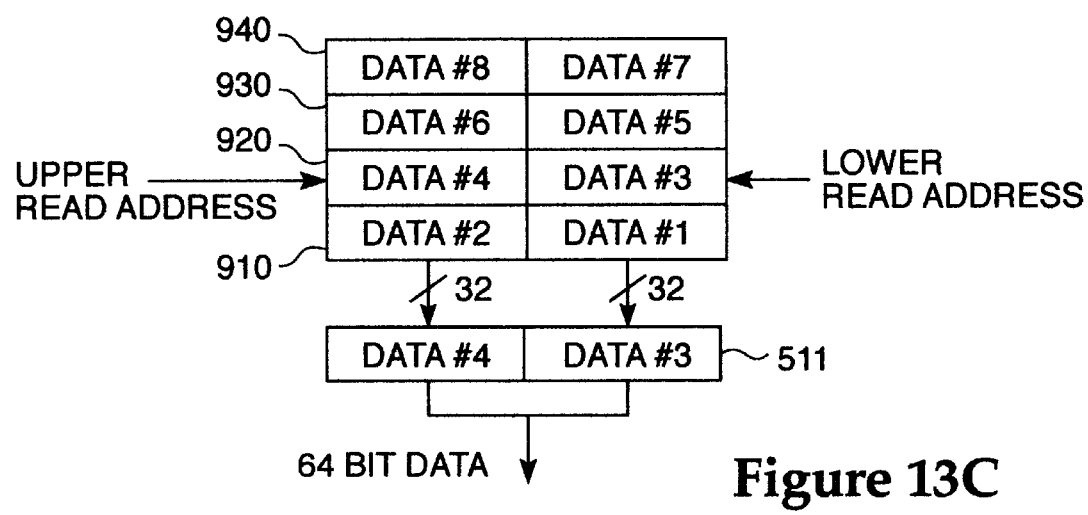

FIGS. 13A, 13B and 13C illustrate architecture and operation of the SRAM and the register which enables access of bits located in two monochrome pixel data words to the multiplexor during a single clock cycle.

DESCRIPTION OF THE PREFERRED EMBODIMENTS

The present invention is described in the context of graphics controller circuit 120 which may comprise three pipe-lines 591–593 (shown in FIG. 2) to generate up to three operands for a raster operation. As the three pipe-lines may generate pixel data corresponding to three operands for a raster operation in parallel, graphics controller circuit 120 of the present invention may generate pixel data for display at a higher rate than in the prior art.

Graphics controller circuit 120 of the present invention may further include a transparency unit 675 which may generate a write enable mask corresponding to pixel data generated by executing raster operations. Display memory 140 may use such a write enable mask to selectively store the pixel data to perform a transparency operation.

Display memory 140 of the present invention may comprise a RAMBUS™ memory with 64-bit words for storing pixel data. Stored pixel data may comprise display data received from host 110 or pixel data generated from raster operations. Display memory 140 may receive a 64-bit (eight bytes) data word resulting from a raster operation and a corresponding write enable mask during a clock cycle. The write enable mask may comprise eight bits corresponding to each byte of the 64-bit data word received, with each bit specifying whether the corresponding byte may be written into display memory 140. Display memory 140 may store (and thus overwrite) only those bytes of data specified by the write enable mask.

For example, with respect to the weather reporter scenario described in the background section, display memory 140 may initially store the image data corresponding to a weather map. Graphics controller 120 may subsequently receive image data of a weather reporter with a blue background. Graphics controller 120 may generate a write enable mask which has a first value corresponding to all blue pixel data, and a second value corresponding to non-blue pixel data. Display memory 140 may store corresponding pixel data with only second value for the write enable mask, thereby generating an image data in which the weather reporter is situated in front of the weather map. Thus, by controlling which pixel data in display memory 140 is overwritten, and by generating display signals from pixel data stored in display memory 140, graphics controller 120 of the present invention may perform a transparency operation.

Figure 1:
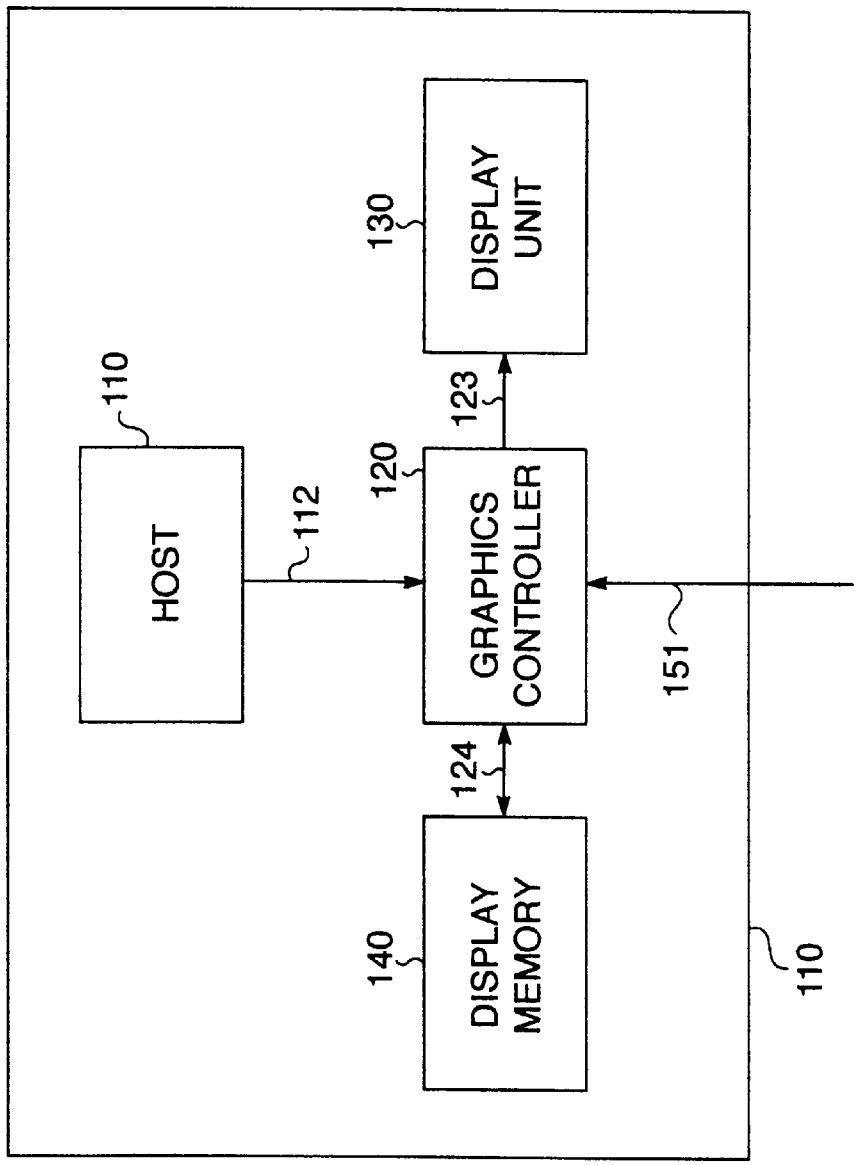
FIG. 1 is a block diagram of a computer system comprising a graphics controller circuit which may store input display data in a display memory, and generate display signals to display an image on a display unit.
Figure 2:
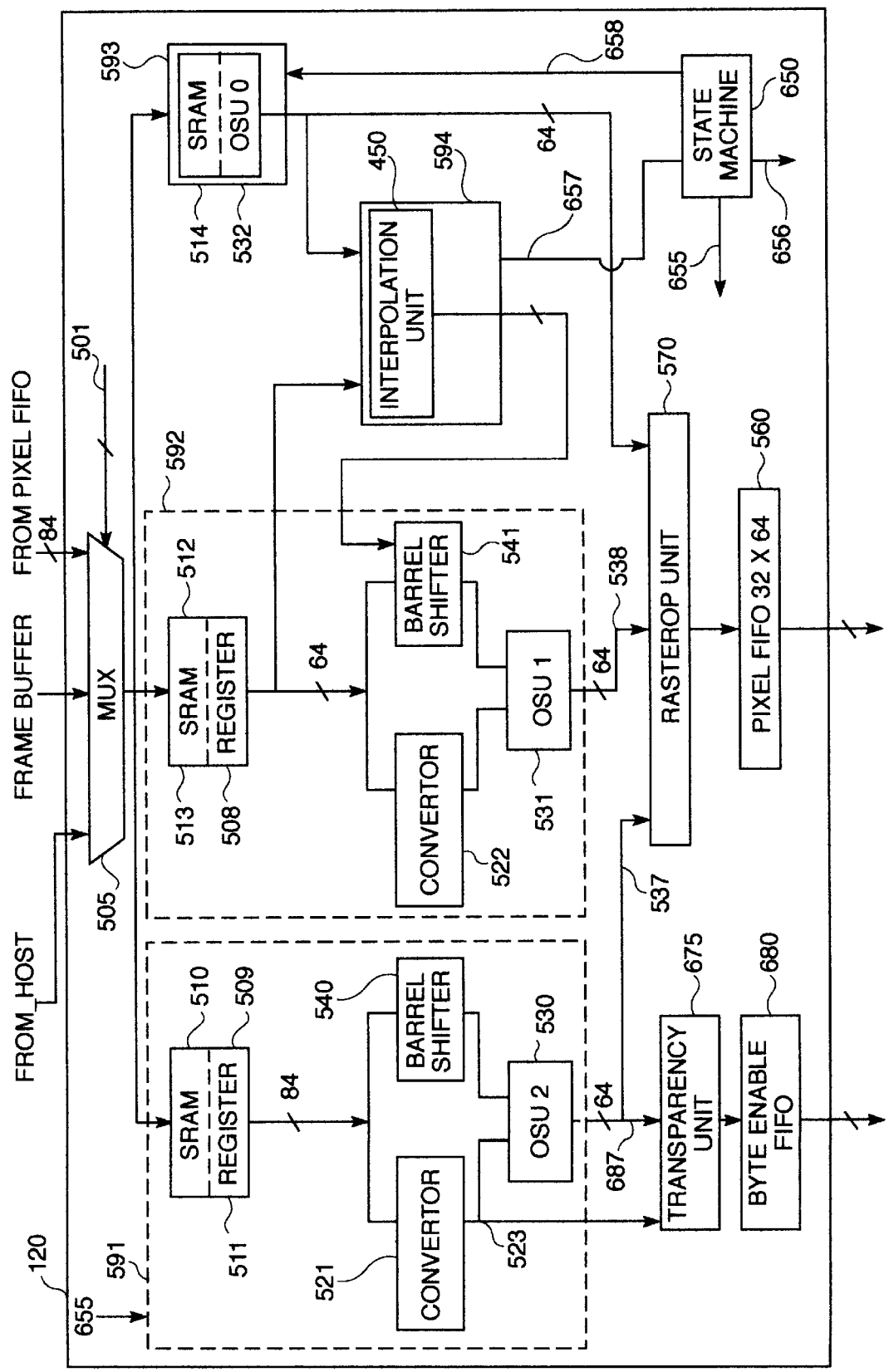
FIG. 2 is a block diagram of graphics controller circuit of the present invention comprising a rasterop unit, a plurality of pipelines for generating operands for a raster operation, and a transparency unit.

FIG. 2 is a block diagram of graphics controller 120 of the present invention comprising pipelines 591–594, multiplexor 505, rasterop unit 570, state machine 650, pixel FIFO 560, byte enable pixel FIFO 680 and transparency unit 675. Pipelines 591–593 of the present invention perform a set of pre-processing steps on a portion of input display data received from multiplexor 505, and provide the output of such pre-processing steps as operands to rasterop unit 570.

Rasterop unit 570 may execute a raster operation from the three operands provided by pipelines 591–593 to generate pixel data from which graphics controller 120 may generate display signals. As rasterop unit 570 receives up to three operands in parallel, rasterop unit 570 may generate pixel data at a higher rate than a prior art rasterop unit. It will be appreciated that rasterop unit 570 may execute raster operations with a lesser number of operands without departing from the scope and spirit of the present invention.

Pixel FIFO 560 may receive from rasterop unit 570 64-bit pixel data words generated from execution of raster operations. Pixel FIFO 560 may store the received pixel data in display memory 140 over memory bus 124. To perform a raster operation with more than three operands, pixel FIFO 560 may send pixel data generated by rasterop unit 570 to multiplexor 505 as an operand for a subsequent iteration. Pixel FIFO 560 may transfer multiple 64-bit pixel words in a single burst transfer to display memory 140. In a preferred embodiment, pixel FIFO 560 may store up to 32 64-bit words, and transfer all the data in a single burst.

Fourth pipeline 594 comprising an interpolation unit 680 may upscale or downsize video image corresponding to input video data, and generate pixel data of corresponding upscaled or downsized video image. Interpolation unit 680 may receive pixel data corresponding to two scan lines of input video data from pipelines 592 and 593 respectively, and interpolate the input video pixel data to generate pixel data of the upscaled or downsized video image. Interpolation unit 680 may send the pixel data generated to pipeline 592. One embodiment of interpolation unit 680 is described in co-pending U.S. patent application Ser. No. 08/536,553, entitled "A Method and Apparatus for Minimizing Number of Pixel Data Fetches Required for a Stretch Operation of Video Images", filed Sep. 28, 1995, and incorporated herein by reference.

Transparency unit 675 of the present invention may receive video data from pipeline 591, compare each pixel data to a color data value representing a background color for a transparency operation, and generate a write enable mask based on the results of comparison. In the weather reporter example described in the background, the background data value may correspond to a number representing a blue color. Transparency unit 675 may generate a write enable bit corresponding to each byte in the video data, with each write enable bit having a first binary value on a match in the comparison and the other binary value otherwise. Display memory 140 may use each write enable bit to selectively store a corresponding byte of the video data.

Transparency unit 675 may send a write enable mask byte (comprising eight byte enable bits) to byte enable FIFO 680 corresponding to a 64-bit word of display data generated by rasterop unit 570. Byte enable FIFO 680 may store such write enable mask bytes, and combine eight such mask bytes to generate a 64-bit write enable mask word. Byte enable FIFO 680 may combine multiple bytes into a word as display memory 140 may be designed to receive a byte enable mask word in stead of eight byte enable bytes. Sixty bits of write enable mask may correspond to multiple 64-bit words transferred from pixel FIFO 560 to display memory 140 during a single burst transfer. Display memory 140 may use each bit in the write enable mask to determine whether to store a corresponding byte.

Multiplexor 505 may receive either color or monochrome pixel data from one of host 110, display memory 140 or pixel FIFO 560, and route pixel data to one of three pipelines 591–593 according to a signal on SRAM-select signal 501. Multiplexor 505 may receive up to 128 bytes of data in a single burst transfer, and forward the data to one of three pipelines 591–593. Pipeline 592 may operate similar to pipeline 592 and in the interest of conciseness, the present embodiment is hereinafter explained with reference to pipeline 591.

State machine 650 may generate control signals to coordinate and control the operation of pipelines 591–594, rasterop unit 570 and other components of graphics controller circuit 120.

Pipeline 591 may comprise memory interface circuit 509, converter 521, barrel shifter 540 and operand storage unit 2 (OSU2) 530 for processing operand 2 of each graphics operation. Memory interface circuit 509 may receive data from multiplexor 505, and provide a subset of monochrome pixel data bits (for example bits 221–223 of FIG. 3) required for generating a corresponding color pixel word (for example color pixel word 230 of FIG. 3) during a clock cycle.

Memory interface circuit 509 may comprise SRAM 510 for storing bytes received from multiplexor 505, and a register 511 for storing two half-words from SRAM 510 and providing a subset of bits required for generating color pixel word from two half-words to convertor 521. Register 511 and SRAM 510 operate to store a subset of bits during a clock cycle even though the subset of bits may be located in two different monochrome pixel words.

If received pixel data comprises monochrome pixel data, SRAM 510 and register 511 of the present invention together operate to provide monochrome pixel data to converter 521. SRAM 510 and register 511 may provide 64-bits of color pixel data to barrel shifter 540 if the pixel data comprises color data.

Converter 521 may convert monochrome pixel data into color pixel data, pack the color pixel data into 64-bit words, and send a 64-bit word during each clock cycle to operand storage unit 2 (OSU2) 530. The format of packed 64-bit pixel data resulting from operation of convertor 521 is illustrated in FIG. 3.

Figure 3:
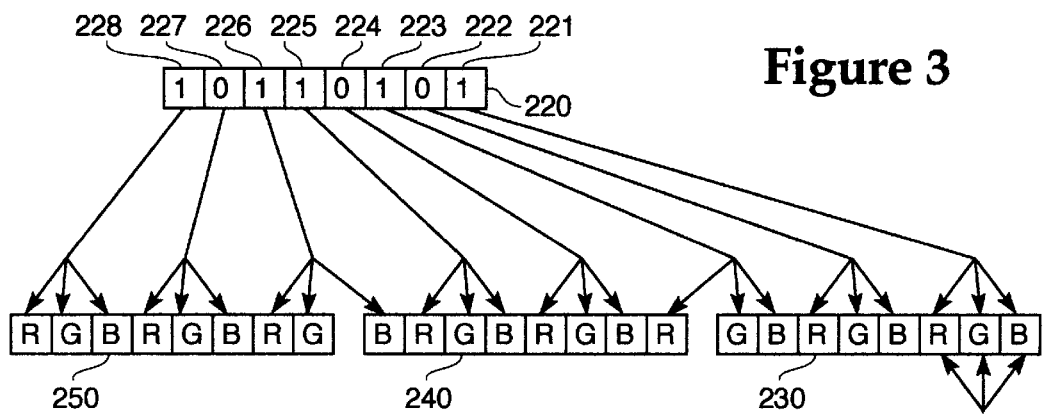
FIG. 3 illustrates conversion of eight bits of monochrome pixel data byte into three 64-bit color pixel words by the graphics controller circuit.

In FIG. 3, three 64-bit color pixel words (230, 240 and 250) resulting from conversion of eight bits (221–228) of monochrome pixel data byte 220 into RGB 888 format are shown. Least significant bit 221 of monochrome pixel data byte 220 is shown converted to three bytes 231–233. Similarly, each of the other bits 222–228 in monochrome pixel data byte 220 is shown converted to three bytes.

Continuing with reference to FIG. 2 again, convertor 521 generates a 64-bit color data word during each clock cycle and forwards color data word to OSU2 530. Although the operation of convertor 521 is explained with reference to RGB 888 format, it will be appreciated that converter 521 of the present invention may convert monochrome pixel data into format other than RGB 888 without departing from the scope and spirit of the present invention.

Barrel shifter 540 may rotate color pixel data received from register 511 for required alignment. For example, if a required pixel data is located from bit position 8, barrel shifter 540 may shift color pixel data by eight positions (corresponding to bits 0–7) to position the required pixel data starting with least significant bit. Barrel shifter 540 forwards rotated color pixel data to OSU2 530.

Second pipeline 592 (to process operand 1) comprising SRAM 512, register 513, convertor 522, and barrel shifter 541 may operate similar to first pipeline 591, and store a 64-bit word for operand 1 in OSU1 531 during each clock cycle. SRAM 514 may provide Operand 0 to OSU0 532.

Rasterop unit 570 may receive three operands (termed source, destination, and pattern operands) from OSU1 531, OSU0 532 and OSU2 530 respectively, and execute a raster operation to generate pixel data. The raster operation may comprise, for example, a boolean logical operation of all or a subset of the three operands. Some raster operations may require less than three operands, in which case operand output of a corresponding OSU may not be used. Raster operation code, which specifies a type of logical operation to be performed on the operands, may be specified by a register in graphics controller 120.

As convertors 521 and 522 generate color pixel data in a packed format (shown in FIG. 3), bandwidth on internal buses (for example 523, 537, 538 and 526) in graphics controller 120 may be efficiently utilized, thereby avoiding potential bottlenecks on such internal buses.

Figure 5:
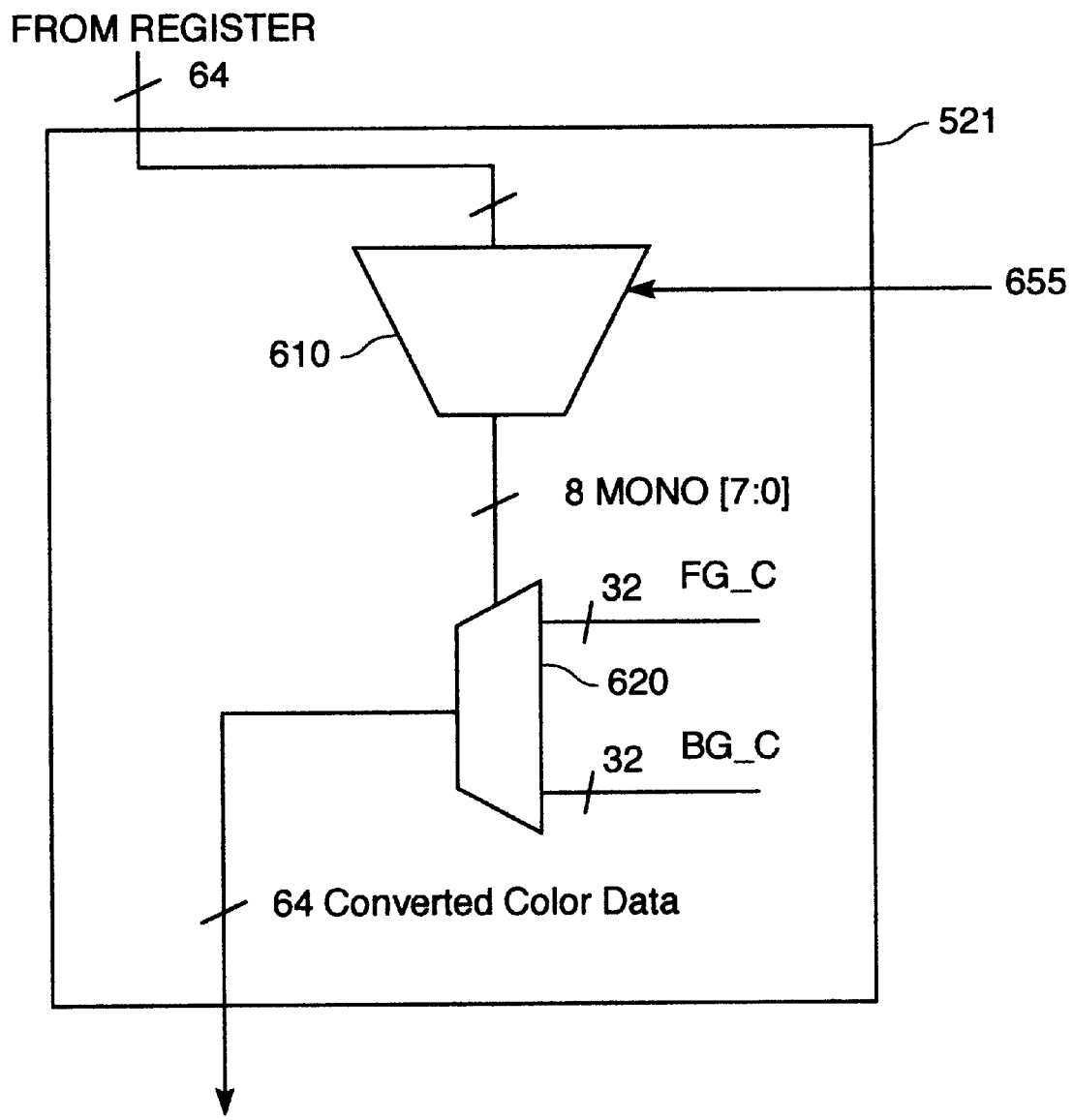
FIG. 5 is a block diagram of convertor comprising multiplexor and color-pixel data generator.

FIG. 5 is a block diagram of convertor 521 comprising multiplexor 610 and color-pixel data generator 620. State machine 650 may generate control signals to multiplexor 610 and color-pixel generator 620 to generate color pixel data in accordance with the flow-chart shown in FIG. 6.

Multiplexor 610 may receive input monochrome pixel data on a 64-bit bus 557 and selectively send a subset of the 64-bits to color-pixel data generator 620. Color pixel data generator 620 receives as input foreground color-data on FG-color 621, background color data on BG-color 622 and the subset of bits on line 612. Color pixel data generator 620 generates 64-bits of packed color pixel data (shown in FIG. 3) from the inputs.

Figure 6:
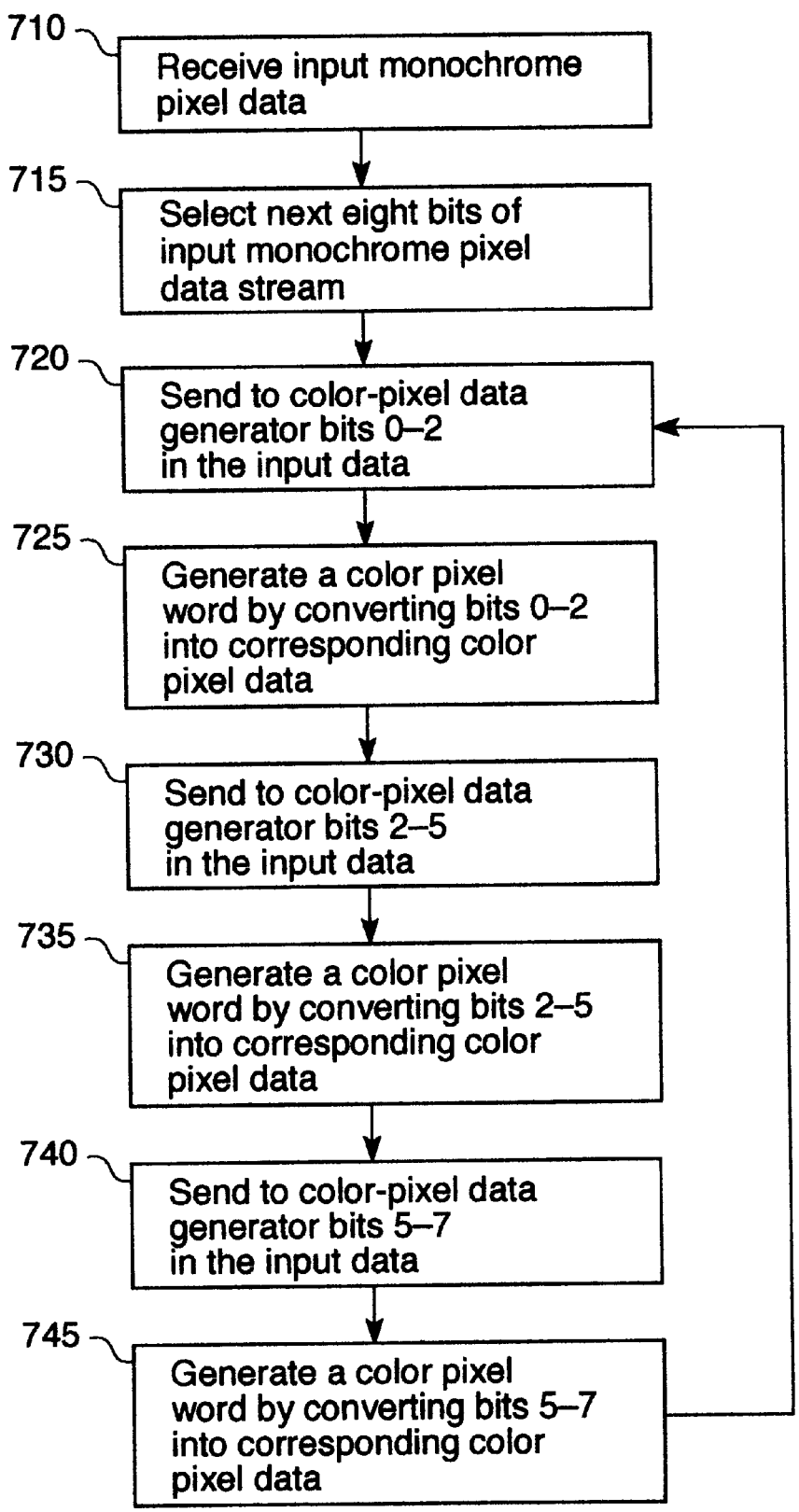
FIG. 6 is a flow-chart illustrating the steps performed by the graphics controller circuit in generating color pixel data words from monochrome pixel data.

FIG. 6 is a flow-chart illustrating the operation of convertor 521 in generating color pixel data from monochrome pixel data. The flow-chart illustrates conversion of eight bits of monochrome pixel data into corresponding eight color pixel data in a RGB 888 format. Eight color pixel data may be stored in three 64-bit words.

Continuing with reference to FIGS. 6 and 5, multiplexor 610 may receive input monochrome pixel data in step 710. In step 715, state machine 650 may generate control signals to select eight bits of the stream of monochrome pixel data (possibly crossing word boundaries). Such eight may comprise the next bits to be converted in the input stream of monochrome pixel data. During a first iteration, the eight bits may correspond to the first eight bits in the input monochrome pixel stream. During subsequent iterations, successive eight bits of monochrome pixel data may be selected.

In step 720, state machine 650 may generate control signals on bus 651 to cause multiplexor 610 to send to color-pixel data generator 620 first three bits (For example, bits 221–223 of FIG. 3) in the 64-bit input data.

In step 725, state machine 650 may generate control signals on bus 652 to cause color-pixel data generator 620 to convert the first three bits into corresponding color pixel data. For conversion of each monochrome pixel data bit, color-pixel data generator 620 selects either the foreground color data or the background color depending on whether the monochrome pixel data bit represents a logical 1 or 0. Color-pixel data generator 620 may generate a 64-bit word comprising all RGB bytes corresponding to two monochrome pixel bits and only GB bytes corresponding to the third monochrome pixel bit as shown in word 230 of FIG. 3.

In step 730, state machine 650 generates control signals on bus 651 to cause multiplexor 610 to send to color-pixel data generator 620 bits 2–5 (For example, bits 223–226 of FIG. 3) in the 64-bit input data. In step 735, state machine 650 generates control signals on bus 652 to cause color-pixel data generator 620 to convert bits 2–5 into corresponding color pixel data. Color-pixel data generator 620 may generate a 64-bit word comprising R byte for bit 2, all RGB bytes for bits 3–4, and B byte for bit 5 as shown in word 240 of FIG. 3.

In step 740, state machine 650 generates control signals on bus 651 to cause multiplexor 610 to send to color-pixel data generator 620 bits 5–7 (For example, bits 226–228 of FIG. 3) in the 64-bit input data. In step 745, state machine 650 generates control signals on bus 652 to cause color-pixel data generator 620 to convert bits 5–7 into corresponding color pixel data. Color-pixel data generator 620 may generate a 64-bit word comprising RG bytes for bit 5, and all RGB bytes for bits 6–7 as shown in word 250 of FIG. 3.

Color-pixel data generator 620 may comprise combinational logic circuitry to generate color pixel data from the subset of 64-bits received from multiplexor 610, and may therefore generate 64-bits of converted pixel data in packed format in a single clock cycle. If multiplexor 610 provides a continuous stream of subset of bits every clock cycle according to diagram in FIG. 6, color-pixel data generator 620 may in response generate 64-bits of color pixel data every clock cycle.

Convertor 521 may repeat steps 715–745 for each of subsequent 8-bit monochrome pixel data in the input monochrome pixel data stream. For each such 8-bit monochrome pixel data, convertor 521 may generate three 64-bit color pixel data words. Convertor 521 may therefore generate a 64-bit color pixel data during each clock cycle. Convertor 620 may provide a 64-bit word per clock cycle to OSU2 530 which may send the 64-bit data to rasterop unit 570 for performing a raster operation. Convertor 522 may also operate similar to convertor 521. By packing color pixel data in the packed manner shown in FIG. 3, convertor 521 may generate a greater number of color pixel data during each clock cycle.

Although the operation of convertor 521 is explained with reference to conversion to RGB 888 format, it will be appreciated that convertor 521 may convert monochrome pixel data to a different color format. For example, convertor 521 may convert each input monochrome pixel datum to 8-bit color data format. In such a case, multiplexor 610 may send eight bits of monochrome pixel data during each clock cycle, and color-pixel data generator 620 may convert the eight bit monochrome pixel data into 64-bit color pixel data.

For color-pixel data generator 620 to generate 64-bit color data words at a rate of one word per clock cycle, multiplexor 610 may need to provide corresponding subset of bits at the same rate. In a conversion scheme wherein color pixel datum for a pixel may cross a word boundary (for example, when converting to RGB 888 format according to flow-chart in FIG. 6), such subset of monochrome pixel data may also cross 64-bit input data word as shown in FIG. 3, and multiplexor 610 may need to access bits from more than one 64-bit words to generate the subset of bits required for color conversion.

To provide access to such multiple 64-bit words of input monochrome pixel data to multiplexor 610, graphics controller 420 of the present invention may employ a split SRAM 510 which provides access to half-words (i.e., 32 bits of 64-bit word). Such ability to access half-words may enable multiplexor 610 to provide the required subset of monochrome pixel data bits consistently during each clock cycle as explained with reference to FIG. 6.

Figure 4:
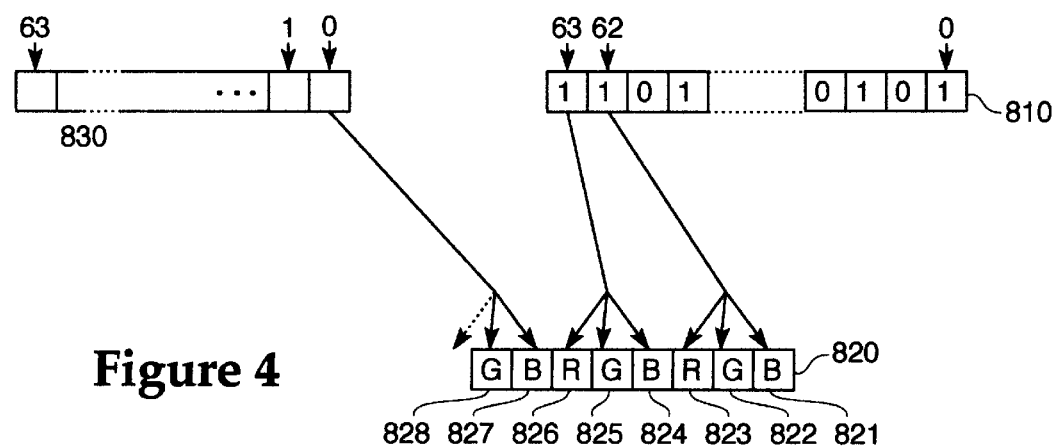
FIG. 4 is a diagram of a monochrome pixel data byte and corresponding color pixel data words illustrating a situation wherein the monochrome pixel data from two monochrome words may be required to generate a corresponding color pixel word during a clock cycle.

FIG. 4 illustrates a situation wherein multiplexor 610 may require access to two 64-bit words to generate the subset of bits necessary for color-pixel data generator 620 to generate 64 bits of output color pixel data word. As will be appreciated, input monochrome pixel data may be stored across multiple words in frame buffer area 542, and such input monochrome pixel data may be stored starting from an intermediate bit within a memory word. Because of such storing, multiplexor 610 may require access to two 64-bit words to generate the subset of monochrome pixel bits for multiplexor 610 to convert to color pixel data.

Each of monochrome pixel data words 810 and 830 may comprise 64 bits of monochrome pixel data. Bits 62 and 63 of monochrome pixel data word 810 are shown converted into color pixel bytes 821–823 and 824–826 of color pixel data word 820. To generate color pixel data for the remaining two bytes 827–828 of color pixel data word 820, color-pixel data generator 620 requires a bit of a subsequent monochrome pixel data word 830. To generate 64 bits of color pixel data per clock cycle, multiplexor 610 may need access to monochrome pixel data word 830 also to provide bits 62 and 63 of monochrome pixel data word 810, and bit 0 of monochrome pixel data word 830 in one clock cycle to color-pixel data generator 620.

FIGS. 13A, 13B and 13C illustrate architecture and operation of SRAM 510 and register 511 which may enable access of bits located in two monochrome pixel data words to multiplexor 610 during a single clock cycle. SRAM 510 may comprise a split SRAM to store sixteen 64-bit words although only four words are shown in FIGS. 13A, 13B and 13C.

SRAM 510 may provide ability to independently access each half-word (i.e., 32 bits) within the 64-bit words. SRAM 510 may comprise an upper read address pointer and a lower read address pointer to access most significant half-words and least-significant half-words respectively of SRAM 510.

In FIG. 13A, upper read address and lower read address are shown pointing to first word 810 of SRAM 510. Accordingly, state machine 650 causes SRAM 510 to store monochrome pixel data in first word 810 in register 511. First word 810 is shown comprising data #2 (upper half-word) and data #1 (lower half-word). Multiplexor 610 receives the 64-bits stored in register 511 and provides subset of bits to color-pixel data generator 620 according to flow-chart in FIG. 6.

As multiplexor 610 completes providing subset of bits in data #1, state machine 650 may increment lower read address pointer to point to second word 820 in SRAM 510. SRAM 510 accordingly stores lower half word (data #3) of second word 820 in register 511 as shown in FIG. 13B.

Multiplexor 610 therefore receives 64-bits of monochrome pixel data comprising data #2 and data #3 once convertor 521 completes processing data #1. Hence, multiplexor 610 will have available bits (data #3) from second word 820 while processing upper half-word (data #2) of first word 810.

As a result, multiplexor 610 may selectively send least significant bits of second word 820 with most significant bits of first word 810 if required by color pixel data generator 620 to generate a complete 64-bit color data word in one clock cycle. Hence, convertor 521 may generate one 64-bit word of color data per each clock cycle.

With reference to FIG. 13C, state machine 650 may increment upper address pointer after multiplexor 610 completes providing subset of bits in data #1 to color-pixel data generator 620. Such incremented pointer is shown pointing to upper half-word of second word 820. SRAM 510 accordingly stores data #4 in register 511. Register 511 may therefore store monochrome pixel data from second word 720.

Hence, as color pixel data generator 620 generates pixels from lower half-word of second word 720, SRAM 510 makes available upper half-word of second word 720 also to multiplexor 610. As bits from upper half-word data #4 are available to multiplexor 610 while processing lower half-word data #3, multiplexor 610 may send least significant bits from data #4 also with most significant bits of data #3 if required for generating a 64-bit color pixel data word in a single clock cycle.

Hence, a half-word addressable split SRAM 510 may enable convertor 521 to consistently generate a 64-bit color pixel data word during each clock cycle. Once convertor 521 generates a 64-bit color pixel word, the color pixel word may be stored in OSU2 530 which may send the color pixel word to rasterop unit 570 for performing a raster operation. SRAM 512 and register 513 may also operate similar to SRAM 510 and register 511 respectively to enable convertor 530 to generate a 64-bit color pixel data word during each clock cycle.

Figure 7:
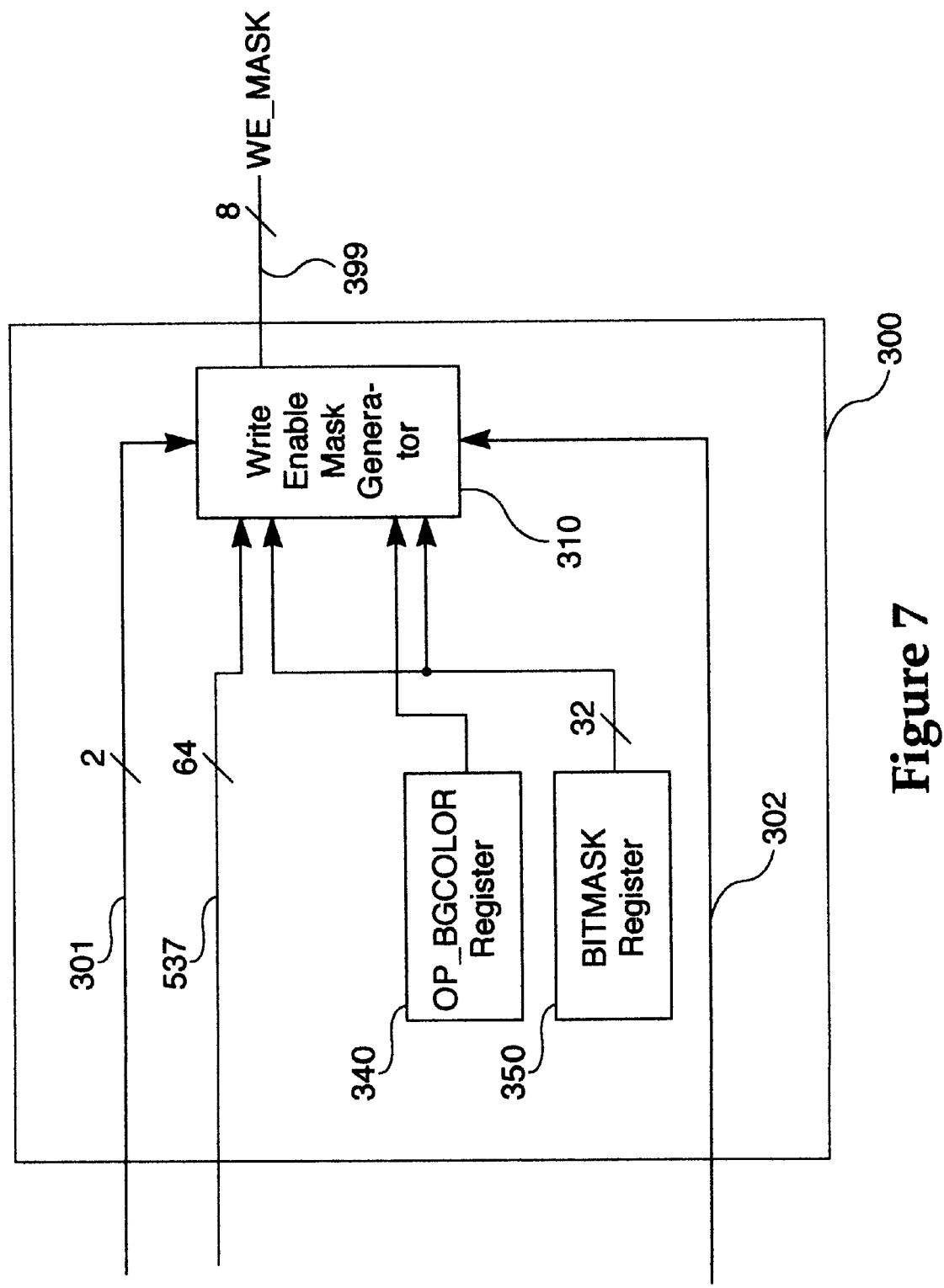
FIG. 7 is block diagram of a part of a transparency unit of the present invention which generates a write enable mask from a transparency input data comprising either monochrome pixel data or color pixel data.

FIG. 7 is a block diagram of color transparency generator 300 which may be comprised in transparency unit 675. Color transparency generator 300 may comprise write enable mask generation circuit 310, bit mask register 350, and OP_BGCOLOR register 340. Color transparency generator 300 may receive color pixel data over OSU2 output line 537, and generate write enable mask bytes from color pixel data on bus 399. Such color pixel data may be comprised in input display data, and may be received from host 110 or display memory 140 or over video port 151.

Bit mask register 350 may comprise 32 bits of bit mask, and may be used to mask certain bit positions in each color pixel data word while generating write enable mask. For example, if input display data is in RGB format, a programmer may want to generate write enable mask based on only the Blue component. Accordingly, bit mask register 350 may be set to zeroes corresponding to the Red and Green components, and to ones corresponding to the Blue component.

If color pixel data is encoded in eight bits per pixel format or sixteen bits per pixel format, the corresponding bit mask (in eight and sixteen bits respectively) may be replicated into all the 32 bits in bit mask register 350. Such a replication may allow color transparency generator 300 to mask corresponding plurality of color pixel data in a single transaction, thereby increasing the throughput performance of the color transparency generator 300.

In general, the bit mask may be replicated in bit mask register 350 when the number of bits in bit mask register 350 comprises an exact multiple of the number of bits in the bit mask. However, when color pixel data is encoded in 24 bits per pixel format, bit mask may not be replicated. Bit per pixel (BPP) bus 301 may indicate the number of bits into which each color pixel data is encoded in. OP-BGCOLOR register 340 may comprise 32 bits, and store a background color data for comparison in generating write enable mask bits.

Figure 8:
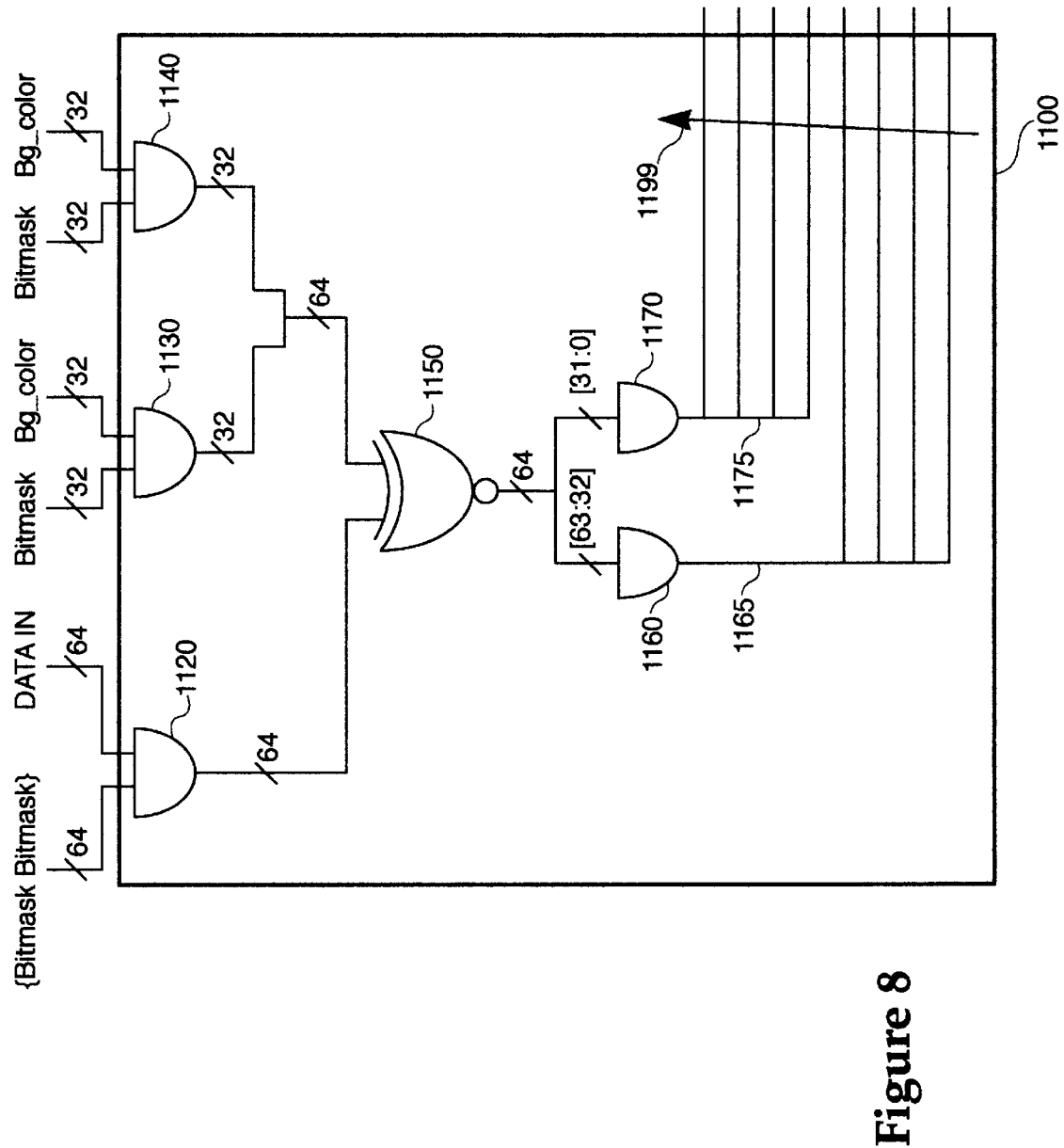
FIG. 8 is block diagram of a part of a write enable mask generation circuit for generating a write enable mask from input display data encoded in thirty two bits per pixel format.

FIG. 8 is a block diagram of a part of write enable mask generation circuit 310 which generates write enable mask byte when color pixel data is encoded in eight bits per pixel format. AND gate 1120 may receive 64 bits of bit mask (32 bits in bit mask register 350 replicated), and perform an AND logical operation with 64-bits of color pixel data word to generate masked color pixel data. AND gates 1130 and 1140 may each perform an AND operation of 32 bits of background color data with 32 bits of bit mask to generate masked background data.

XOR gate 1150 may perform an XOR operation of masked color pixel data with masked background data on a bit by bit basis to generate a 64-bit comparison result. AND gates 1160 and 1170 may each perform an AND operation of 32 bits of the comparison result. The output of each AND gate 1160 and 1170 may accordingly be a logical value of 1 if all of the corresponding 32 bits have a logical value of 1, and a 0 otherwise. Each of the two output bits of AND gates 1160 and 1170 may be replicated into four bits to form an eight bit output on bus 1199.

FIG. 9 is a block diagram of a part of write enable mask generation circuit 310 which generates write enable mask byte when color pixel data is encoded in sixteen bits per pixel format. AND gates 1220, 1230, 1240 and XOR gate 1250 operate similar to AND gates 1120, 1130 and XOR gate 1150 to generate a comparison result of masked input display data and masked background color data. Each AND gate 1270, 1280, 1290 and 1260 may perform a logical AND operation of sixteen bits in the comparison result to generate a logical value of 1 if there is a match in comparison, and a 0 otherwise. Each of the output bits of AND gates 1260, 1270, 1280 and 1290 are replicated into two bits to generate an eight bit output on bus 1299.

FIG. 10 is a block diagram of a part of write enable mask generation circuit 310 which generates write enable mask byte when color pixel data is encoded in thirty two bits per pixel format. AND gates 1320, 1330, 1340 and XOR gate 1350 operate similar to AND gates 1120, 1130 and XOR gate 1150 to generate a comparison result of masked input display data and masked background color data. Each AND gate 1361–1368 may perform a logical AND operation of eight bits in the comparison result to generate a logical value of 1 if there is a match in comparison, and a 0 otherwise. output bits of AND gates 1361–1368 on bus 1399.

With reference to FIGS. 7–10, write enable mask generation circuit 310 may generate as byte enable mask either the output bits on one of the buses 1199, 1299, 1399 or an inverted result of the output bits under the control of transparency operation signal 302. Transparency operation signal 302 may be set to 1 or 0 by a programmer to select either the output on buses 1199, 1299, 1399 or the inverted output bits. Such a selection may be required to selectively enable or block writing pixel data generated by rasterop unit 570 when a match is detected between a background color data and input display data as illustrated with an example below.

Referring to the weather report example explained in the background section, input color display data received by transparency unit 675 may comprise the pixel data corresponding to a weather reporter with a blue background. In a first scenario, the weather map pixel data may be previously stored in display memory 140, and the weather reporter image pixel data may be generated as output of rasterop unit 570.

In parallel, the weather reporter image pixel data may be received by transparency unit 675 to generate a write enable mask. Such a write enable mask may be required to enable storing of only pixel data corresponding to non-blue pixel data generated by rasterop unit 570 in display memory 140. Assuming a value of 1 in the write enable mask enables storing corresponding data into display memory 140 and a 0 blocks storing corresponding data, transparency operation signal 302 may force write enable mask generation circuit 310 to select as write enable mask the inverted values of output bits received on bus 1199, 1299 or 1399. The inverted values may have a logical value of 1 (which allow storage) corresponding to non-blue pixels (i,e., no match), and a 0 corresponding to blue pixels. As weather reporter image pixel data that corresponds to blue pixels are not stored, the image of corresponding weather map pixel data in display memory continues to be stored in display memory 140, thereby giving a resultant image with weather reporter being located in front of weather map.

In a second scenario, weather reporter image pixel data may be stored in display memory 140, and weather map pixel data may be generated by rasterop unit 570. Transparency unit 675 again receives weather reporter image pixel data for generating write enable mask. However, in the second scenario, weather map pixel data that corresponds to only blue pixel data in the weather reporter image pixel data needs to be stored in display memory 140. Accordingly, transparency operation line 302 may force write enable mask generation circuit to output data received on bus 1199, 1299 or 1399 as write enable mask.

As such output data has a logical value of 1 when pixel data matches with a background color data (i.e., blue), weather map pixel data that corresponds to blue pixels in the weather reporter image may be stored in display memory 140. The result again may be an image with the weather reporter in front of a weather map.

The write enable mask generation schemes described above with reference to FIGS. 8–10 may not allow generating a write enable mask when color pixel data is encoded in a 24 bits per pixel (bpp) format. Generating a write enable mask in 24 bpp encoding may require a different circuit as color pixel data may cross word boundaries as shown in FIGS. 2 and 3. Accordingly, write enable mask generation circuit 310 generates write enable masks in accordance with flow chart of FIG. 12.

FIG. 12 is a flow chart illustrating a method of generating three write enable mask bytes from three 64-bit words comprising color pixel data encoded in 24 bpp format in accordance with the present invention. Write enable mask generation circuit 310 may compare 24-bits of background color data stored in bits 0:23 of OP_BGCOLOR register 340 with 24-bits of data in the stream of input display data, and generate three bits of write enable mask. It will be appreciated that state machine 650 may generate control signals to coordinate the generation of write enable mask bytes with operation of other components in graphics controller circuit 120.

In step 1410, write enable mask generation circuit 310 may receive a first 64-bit word from OSU2 530, and first two bytes of a second 64-bit word from convertor 521. It will be appreciated that convertor 523 may generate the second word while the first word is stored in OSU2 520 during a same clock cycle. By taking advantage of such early availability of second word (or word subsequent to the word stored in OSU2 530), write enable mask generator of the present invention may generate write enable mask bits from input display data bits crossing word boundaries.

In step 1415, write enable mask generation circuit may compare bits 0:23 of first 64-bit word with background color, and generate bits 0:2 of first write enable mask based on comparison results in step 1420. All write enable mask bits generated based on a comparison may have a same logical value.

Such logical value may depend both on the result of comparison and transparency operation signal 302. For example, on detecting a match from comparison, write enable mask generation circuit 310 may generate a logical value of 0 for each write enable mask bit if transparency operation signal 302 has a logical value of 0, and a logical value of 1 if transparency operation signal 302 has a logical value of 1.

On the other hand, if a match is not detected, write enable mask generation circuit 310 may generate a logical value of 1 for each write enable mask bit if transparency operation signal 302 has a logical value of 0, and a logical value of 1 if transparency operation signal 302 has a logical value of 0. As the logical value of write enable mask bit may depend on transparency operation signal 302, a programmer of computer system 100 may optionally either write or block writing of display pixel data into display memory 130 on detecting a match.

In step 1425, write enable mask generation circuit 310 may compare bits 24:47 of first word with background color data, and generate bits 3:5 of first write enable mask byte based on comparison results in step 1430. In step 1435, write enable circuit may compare bits 48:63 of first word and bits 0:7 of second word with background color, and generate bits 6:7 of the first write enable mask byte and bit 0 of the second write enable mask in step 1440 based on the results of comparison. As already explained in step 1420, each of three byte enable mask bits generated based on a comparison may be assigned same logical value.

In step 1445, write enable mask generation circuit 310 may receive second word and first two bytes of the third word. Write enable mask register 310 may generate bits 1:7 of second write enable mask byte, and bits 0–1 of third write enable mask byte from second word and first two bytes of the third word during steps 1450–1475.

In step 1480, write enable mask generation circuit 310 may receive third word from OSU2 530, and generate bits 2–7 of third byte during steps 1485–1499. Write enable mask generation circuit 310 may repeat steps 1410–1499 for each successive three 64-bits of color display data encoded in 24 bpp format, and generate three bytes of write enable mask bytes.

FIG. 11 is a block diagram of monochrome transparency generator 1700 comprised in transparency unit 675. Monochrome transparency generator 1700 may receive monochrome pixel data (which may be used to convert to color pixel data) which may be comprised in the input display data received from multiplexor 505, and generate a write enable mask from the monochrome pixel data. The write enable mask may determine which of the bytes generated by rasterop unit 570 may be stored into display memory 140. Rasterop unit 570 may generate color pixel data, which may be in one of several possible formats. For example, the color pixel data may be in RGB 888 format or each pixel stored in a byte.

Multiplexor 1710 may select as output either monochrome pixel data received on input line 523 or inverted data received from invertor 1720 under the control of transparency operation signal 1760. Transparency operation signal 1760 may be set to 1 or 0 by a programmer to select either monochrome pixel or the inverted pixel data. Such a selection may be required to selectively enable or block writing pixel data generated by rasterop unit 570 when a match is detected between a background color data and input display data.

The data received on line 1713 may correspond to write enable mask if the each pixel of corresponding color pixel data is stored in a byte each. However, in the present embodiment, the monochrome pixel data may be converted into color pixel data of several formats. For example, as explained with reference to FIG. 3, each monochrome pixel data may be converted to three bytes of color pixel data (i.e., 24 bits per pixel data format). 24 bpp transparency generator 1700 may perform additional steps to generate write enable mask when monochrome pixel data is converted to 24 bits per pixel data format (for example RGB 888).

24 bpp transparency generator 1730 may receive 8-bits of data on line 1713, and generate corresponding 24 bits of byte enable mask data bits. 24 bpp transparency generator 1730 may replicate each bit received into three bits, and pack the resulting 24-bits into three bytes. It will be noted that three bits replicated from a bit may cross byte boundaries as illustrated with reference to the method of FIG. 12.

Such crossing may correspond to word-boundary crossing which may result when converting monochrome pixel data to 24 bits per pixel color pixel data format shown in FIG. 3. State machine 650 may generate signals to 24 bpp transparency generator 1730 for coordination of such alignment.

BPP signal 301 may indicate number of bits per pixel into which each monochrome pixel data is being converted to, and multiplexor 1740 may accordingly select the corresponding input as write enable mask. For example, BPP signal 1770 may indicate that convertor 521 is converting each monochrome pixel data to 24 bits per pixel, and multiplexor 1740 may accordingly select output of 24 bpp transparency generator as write enable mask on output signal line 678.

Byte enable FIFO 680 may receive such write enable mask bytes, and provide several such bytes as a write enable mask word to display memory 140. Display memory 140 may receive corresponding color pixel data in parallel from pixel FIFO 560, and selectively store color pixel data bytes as specified by write enable mask word.

Although the above explanation is provided with respect to conversion of monochrome pixel data to 24 bpp color data and 8 bits per pixel color data, it will be appreciated that additional circuitry such as 24 bpp transparency generator 1730 may be implemented to support other bits per pixel data format without departing from the scope and spirit of the present invention. For example, monochrome transparency generator 1700 may also selectively generate 16 bits per pixel format using additional circuitry, in which case each bit on line 1713 may be replicated to generate two bits of the write enable mask.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A graphics controller for executing a raster operation on a stream of input pixel data, comprising:

a plurality of pipelines including at least a first pipeline and a second pipeline for performing a set of operations on the stream of input pixel data to generate a first operand and a second operand, respectively, for the raster operation; and a rasterop unit coupled to said plurality of pipelines to receive the first operand and the second operand, for executing the raster operation using the first operand and the second operand to generate a set of display pixel data, wherein said first pipeline and said second pipeline comprise:

a memory interface for receiving the set of pixel data;

a converter for converting the set of pixel data to a set of color pixel data if the set of pixel data comprise monochrome pixel data;

a barrel shifter for rotating the set of pixel data within a word to generate a set of rotated data words; and an operand storage unit coupled to said convertor and said barrel shifter for receiving the set of color pixel data and the set of rotated data words.

2. The graphics controller of claim 1, further comprising:

an interface to transfer the set of display pixel data to a memory, wherein said memory stores the set of display pixel data, and wherein said graphics controller generates a set of display signals to a display unit from the set of pixel data stored in said memory.

3. The graphics controller of claim 2, wherein said plurality of pipelines further comprises:

a third pipeline for performing a set of operations on the stream of input pixel data to generate a third operand for the raster operation.

4. The graphics controller of claim 3, further comprising:

an interpolation unit for interpolating the stream of input pixel data to generate pixel data corresponding to an upscaled video image.

5. The graphics controller of claim 3, wherein said interpolation unit provides pixel data corresponding to the upscaled video image as the second operand to said rasterop unit.

6. The graphics controller of claim 3, further comprising:

a pixel FIFO for receiving the set of pixel data from said rasterop unit, wherein said interface transfers the set of pixel data from said pixel FIFO to said memory.

7. The computer system of claim 6, wherein said color transparency generator generates the write enable mask for the color pixel data in 24 bits per pixel format, and wherein eight color pixel data are packed in three 64-bit words.

8. A graphics controller for executing a raster operation on a stream of input pixel data, comprising:

a plurality of pipelines including at least a first pipeline and a second pipeline for performing a set of operations on the stream of input pixel data to generate a first operand and a second operand, respectively, for the raster operation;

a rasterop unit coupled to said plurality of pipelines to receive the first operand and the second operand, for executing the raster operation using the first operand and the second operand to generate a set of display pixel data;

an interface to transfer the set of display pixel data to a memory; and a transparency unit for generating a write enable mask, wherein said memory stores the set of display pixel data, wherein said graphics controller generates a set of display signals to a display unit from the set of pixel data stored in said memory, and wherein said memory receives the set of display pixel data from said rasterop unit and selectively stores the set of display pixel data according to the write enable mask.

9. The graphics controller of claim 8, wherein said transparency unit comprises:

a color transparency generator for receiving a set of color pixel data and for generating the write enable mask from the set of color pixel data; and a monochrome transparency generator for receiving a set of monochrome pixel data and for generating the write enable mask from the set of monochrome pixel data.

10. The graphics controller of claim 9, wherein said monochrome transparency generator comprises:

an invertor for generating a set of inverted monochrome pixel data from the set of monochrome pixel data;

a first multiplexor for receiving the set of monochrome pixel data and the set of inverted monochrome pixel data and for selecting as output one of the set of monochrome pixel data and the set of inverted monochrome pixel data under the control of a transparency operation signal, wherein the output comprises the write enable mask for a first set of converted color pixel data, and wherein each of the first set of converted color pixel data corresponds to a monochrome pixel data converted into eight bit per pixel data format;

24 bpp transparency generator for generating a write enable mask for a second set of converted pixel data, wherein each of the second set of converted pixel data corresponds to a monochrome pixel data converted into 24 bits per pixel data format; and a second multiplexor for selectively coupling one of the write enable masks for the first set of converted color pixel data and the second set of color pixel data to said memory.

11. The graphics controller of claim 9, wherein said color transparency generator comprises:

a background color register for storing a background color data for a transparency operation;

a bit mask register for storing a mask to mask a subset of the bits in the set of color pixel data while generating the write enable mask; and a write enable mask generator for generating the write enable mask for the set of color pixel data.

12. The graphics controller of claim 11, wherein the write enable mask generator comprises:

a first set of gates for generating a set of masked color pixel data by masking the subset of the bit positions in the set of color pixel data according to the mask;

a second set of gates for generating a masked background color data by masking the background color data; and means for comparing each of the set of masked color pixel data with the masked background color data and for generating a first logical value upon a match and a second logical value otherwise, wherein said means for comparing replicates the first logical value and the second logical value for generating the write enable mask.

13. The graphics controller of claim 9, wherein said color transparency generator generates the write enable mask for the color pixel data in 24 bits per pixel format, and wherein eight color pixel data are packed in three 64-bit words.

14. A graphics controller for executing a raster operation on a stream of input pixel data, comprising:

a plurality of pipelines including at least a first pipeline and a second pipeline for performing a set of operations on the stream of input pixel data to generate a first operand and a second operand, respectively, for the raster operation;

a rasterop unit coupled to said plurality of pipelines to receive the first operand and the second operand, for executing the raster operation using the first operand and the second operand to generate a set of display pixel data;

an interface to transfer the set of display pixel data to a memory;

a third pipeline for performing a set of operations on the stream of input pixel data to generate a third operand for the raster operation;

a pixel FIFO for receiving the set of pixel data from said rasterop unit; and a third multiplexor for receiving the set of input pixel data from a host or said memory or said pixel FIFO and selectively forwarding the set of pixel data to one of said plurality of pipelines, wherein said memory stores the set of display pixel data, wherein said graphics controller generates a set of display signals to a display unit from the set of pixel data stored in said memory, and wherein said interface transfers the set of pixel data from said pixel FIFO to said memory.

15. The graphics controller of claim 14, wherein said first pipeline and said second pipeline comprise:

a memory interface for receiving the set of pixel data;

a converter for converting the set of pixel data to a set of color pixel data if the set of pixel data comprise monochrome pixel data;

a barrel shifter for rotating the set of pixel data within a word to generate a set of rotated data words; and an operand storage unit coupled to said convertor and said barrel shifter for receiving the set of color pixel data and the set of rotated data words.

16. A computer system for displaying an image corresponding to a stream of input display data, comprising:

a display unit for displaying the image;

a display memory for storing a set of display pixel data;

a graphics controller for receiving the stream of input display data and generating the set of display pixel data, the graphics controller storing the set of display pixel data in said display memory and generating display signals to said display unit to display the image, said graphics controller further comprising:

a plurality of pipelines comprising at least a first pipeline and a second pipeline for performing a set of operations on the stream of input pixel data to generate a first operand and a second operand, respectively, for a raster operation; and a rasterop unit coupled to the plurality of pipelines to receive the first operand and the second operand, for executing the raster operation using the first operand and the second operand to generate the set of display pixel data, wherein said first pipeline and said second pipeline comprise:

a memory interface for receiving the set of pixel data;

a converter for converting the set of pixel data to a set of color pixel data if the set of pixel data comprise monochrome pixel data;

a barrel shifter for rotating the set of pixel data within a word to generate a set of rotated data words; and an operand storage unit coupled to said convertor and said barrel shifter for receiving the set of color pixel data and the set of rotated data words.

17. The computer system of claim 16, wherein said plurality of pipelines further comprises:

a third pipeline for performing a set of operations on the stream of input pixel data to generate a third operand for the raster operation.

18. The computer system of claim 17, further comprising:

an interpolation unit for interpolating the stream of input pixel data to generate pixel data corresponding to an upscaled video image.

19. The computer system of claim 18, wherein said interpolation unit provides pixel data corresponding to the upscaled video image as the second operand to said rasterop unit.

20. The computer system of claim 17, further comprising:

a pixel FIFO for receiving the set of pixel data from said rasterop unit, wherein said interface transfers the set of pixel data from said pixel FIFO to said memory.

21. A computer system for displaying an image corresponding to a stream of input display data, comprising:

a display unit for displaying the image;

a display memory for storing a set of display pixel data;

a graphics controller for receiving the stream of input display data and generating the set of display pixel data, the graphics controller storing the set of display pixel data in said display memory and generating display signals to said display unit to display the image, said graphics controller further comprising:

a plurality of pipelines comprising at least a first pipeline and a second pipeline for performing a set of operations on the stream of input pixel data to generate a first operand and a second operand, respectively, for a raster operation;

a rasterop unit coupled to the plurality of pipelines to receive the first operand and the second operand, for executing the raster operation using the first operand and the second operand to generate the set of display pixel data; and a transparency unit for generating a write enable mask, wherein said memory receives the set of display pixel data from said rasterop unit and selectively stores the set of display pixel data according to the write enable mask.

22. The computer system of claim 21, wherein said transparency unit comprises:

a color transparency generator for receiving a set of color pixel data and for generating the write enable mask from the set of color pixel data; and a monochrome transparency generator for receiving a set of monochrome pixel data and for generating the write enable mask from the set of monochrome pixel data.

23. The computer system of claim 22, wherein said color transparency generator comprises:

a background color register for storing a background color data for a transparency operation;

a bit mask register for storing a mask to mask a subset of the bits in the set of color pixel data while generating the write enable mask; and a write enable mask generator for generating the write enable mask for the set of color pixel data.

24. The computer system of claim 23, wherein the write enable mask generator comprises:

a first set of gates for generating a set of masked color pixel data by masking the subset of the bit positions in the set of color pixel data according to the mask;

a second set of gates for generating a masked background color data by masking the background color data; and means for comparing each of the set of masked color pixel data with the masked background color data and for generating a first logical value upon a match and a second logical value otherwise, wherein said means for comparing replicates the first logical value and the second logical value for generating the write enable mask.

25. The computer system of claim 21, wherein said monochrome transparency generator comprises:

an invertor for generating a set of inverted monochrome pixel data from the set of monochrome pixel data;

a first multiplexor for receiving the set of monochrome pixel data and the set of inverted monochrome pixel data and for selecting as output one of the set of monochrome pixel data and the set of inverted monochrome pixel data under the control of a transparency operation signal, wherein the output comprises the write enable mask for a first set of converted color pixel data, and wherein each of the first set of converted color pixel data corresponds to a monochrome pixel data converted into eight bit per pixel data format;

24 bpp transparency generator for generating a write enable mask for a second set of converted pixel data, wherein each of the second set of converted pixel data corresponds to a monochrome pixel data converted into 24 bits per pixel data format; and a second multiplexor for selectively coupling one of the write enable mask for the first set of converted color pixel data or the second set of color pixel data to said memory.

26. A computer system for displaying an image corresponding to a stream of input display data, comprising:

a display unit for displaying the image;

a display memory for storing a set of display pixel data;

a graphics controller for receiving the stream of input display data and generating the set of display pixel data, the graphics controller storing the set of display pixel data in said display memory and generating display signals to said display unit to display the image, said graphics controller further comprising:

a plurality of pipelines comprising at least a first pipeline and a second pipeline for performing a set of operations on the stream of input pixel data to generate a first operand and a second operand, respectively, for a raster operation, wherein said plurality of pipelines further comprises a third pipeline for performing a set of operations on the stream of input pixel data to generate a third operand for the raster operation;

a rasterop unit coupled to the plurality of pipelines to receive the first operand and the second operand, for executing the raster operation using the first operand and the second operand to generate the set of display pixel data; a pixel FIFO for receiving the set of pixel data from said rasterop unit; and a third multiplexor for receiving the set of input pixel data from a host or said memory or said pixel FIFO and selectively forwarding the set of pixel data to one of said plurality of pipelines, wherein said interface transfers the set of pixel data from said pixel FIFO to said memory.

27. The computer system of claim 26, wherein said first pipeline and said second pipeline comprise:

a memory interface for receiving the set of pixel data;

a converter for converting the set of pixel data to a set of color pixel data if the set of pixel data comprise monochrome pixel data;

a barrel shifter for rotating the set of pixel data within a word to generate a set of rotated data words; and an operand storage unit coupled to said convertor and said barrel shifter for receiving the set of color pixel data and the set of rotated data words.

28. A method of displaying an image corresponding to a stream of input pixel data, comprising the steps of:

performing a set of operations on the stream of input pixel data concurrently in at least a first pipeline and a second pipeline to generate a first operand and a second operand, respectively, for the raster operation;

executing the raster operation using the first operand and the second operand to generate a set of display pixel data; and generating display signals to a display unit from the set of display pixel data, wherein said step of performing a set of operations on the stream of input pixel data concurrently in at least a first pipeline and a second pipeline comprises the steps of:

receiving, in a memory interface in the first pipeline and the second pipeline, a corresponding set of pixel data;

converting, in a converter in the first pipeline and the second pipeline, the corresponding set of pixel data to a set of color pixel data if the corresponding set of pixel data comprise monochrome pixel data;

rotating, in a barrel shifter in the first pipeline and the second pipeline, the corresponding set of pixel data within a word to generate a corresponding set of rotated data words; and storing, in an operand storage unit in the first pipeline and the second pipeline, coupled to corresponding convertors and barrel shifters, the corresponding sets of color pixel data and the corresponding sets of rotated data words.

29. The method of claim 28, further comprising the step of:

storing the set of display pixel data in a memory, wherein said step of generating display signals further comprises the step of:

generating a display signal from the set of display pixel data stored in the memory.

30. A method of displaying an image corresponding to a stream of input pixel data, comprising the steps of:

performing a set of operations on the stream of input pixel data concurrently in at least a first pipeline and a second pipeline to generate a first operand and a second operand, respectively, for the raster operation;

executing the raster operation using the first operand and the second operand to generate a set of display pixel data;

generating display signals to a display unit from the set of display pixel data, wherein said step of generating display signals further comprises the step of generating a display signal from the set of display pixel data stored in the memory;

storing the set of display pixel data in a memory;

comparing the set of input pixel data to a background color data; and generating a write enable mask based on said step of comparing, wherein said step of storing further comprises the step of:

selectively storing the set of display pixel data in the memory according to the write enable mask.

* * * * *